Patented Jan. 26, 1926.

1,570,957

UNITED STATES PATENT OFFICE.

OTTO L. FLUEGEL, OF BIRMINGHAM, MICHIGAN.

COMPOSITION OF MATTER FOR A PAINT REMOVER.

No Drawing.    Application filed January 24, 1925.    Serial No. 4,446.

*To all whom it may concern:*

Be it known that I, OTTO L. FLUEGEL, a citizen of the United States, now residing in the city of Birmingham, county of Oakland, State of Michigan, have invented certain new and useful Improvements in a Composition of Matter for a Paint Remover, of which the following is a specification.

My composition relates to a compound especially adapted for applying, dissolving and removing paint from metal or wood surfaces.

The object of my invention is to produce a paint remover that can be readily applied to a dry painted surface, with a brush or spray, after which the paint can easily be removed therefrom.

Another object is to produce a chemical paint remover that is equally as well adapted to both wood and metal surfaces, and which will dissolve and remove therefrom all particles of paint, without attacking or injuring the metal or wood in any manner, or leaving discolored surfaces thereon.

A further object is to produce a chemical paint remover that is odorless, and that will not effervesce when subjected to the air, or is not subject to combustion if brought in contact with a flame, and that is not poisonous or injurious to the skin, or fabric materials, if brought in contact therewith.

It is commonly known that there are many paint removing compounds on the market at the present time, but most of which are extremely hazardous in their use, because of the poisonous fumes effervescing therefrom and which are subject to explosions if ignited in a closed room. Also of the danger of injury if the solution should come in contact with the skin. Likewise, being equally as destructive to all fabric material it may come in contact with.

In carrying out my invention, I use ingredients therein which will instantly attack and dissolve the paint, disintegrating same when applied to painted surfaces, and at the same time neutralizing the paint composition so as to prevent it from again rehardening or adhering to the surface, should it be allowed to dry before removing same from the supporting surface. Certain ingredients are also added thereto for preventing the composition from injuring or discoloring the surface of either wood or metal, when applied thereto.

In preparing my composition, I use the following ingredients: flake caustic alkali, tri-sodium phosphate, oxalic acid, hydrate of lime, starch and water.

The preferred proportions for producing results of the highest efficiency, where prepared for all classes of work on both metal and wood, are as follows; for producing one gallon of the solution: flake caustic alkali, 1 pound; tri-sodium phosphate, ½ pound; oxalic acid, ½ pound; hydrate of lime, 1 pound; starch, 3 ounces.

The ingredient, caustic alkali, as used throughout this application and claims, is understood to include either, or both caustic soda or caustic potash.

The above formula producing the most effective compound for general use on both metal and wood surfaces, and without injury or discoloring same. However if the compound is for use on metal alone, the tri-sodium phosphate may be omitted therefrom.

The purpose of the caustic alkali is to attack and dissolve the hardened paint as soon as applied thereto, while the hydrate of lime neutralizes the acid in the composition, preventing same from attacking or injuring the fiber of the wood or the metal surface to which the coat of paint is attached. The solution reacts on the paint composition, dissolving and disintegrating the ingredients therein, changing its properties so the paint will not again harden if it should be allowed to again dry on the surface, but would dry in a powdered form, easily brushed from the surface. The oxalic acid being used for hastening the action of the solution upon the dried paint, while the starch acts as a binder and produces an adhesive quality to the composition, preventing any of its elements from separating therefrom and adhering to the surfaces to which the solution may be applied.

While the foregoing formula sets forth the preferred proportions of the ingredients used therein, it is obvious that my invention is subject to various modifications in the proportions without varying from the spirit of the invention, and by extensive experiments of this inventor, it is determined that very good results may be obtained by varying the proportions of the ingredients herein used between the following proportions:

For compounding approximately one gallon of solution, flake caustic alkali, from ¼ lb. to 2 lbs.; tri-sodium phosphate, from ¼ lb. to 2 lbs.; oxalic acid, from 1 oz. to 2 lbs.; hydrate of lime, from ¼ lb. to 2 lbs.; starch, from ½ oz. to 5 ozs.

Should the solution be compounded for immersion of painted parts therein, the starch may be omitted, but the composition would require continuous agitation to prevent a precipitation forming therein.

It is mentioned that the above elements of the compound herein stated are to be united and combined by a special process as is set forth in another patent.

When properly compounded, the composition will not precipitate or effervesce in any manner, and is not inflammable, or injurious to the skin or to fabric.

Having fully described my composition for paint remover, what I claim as my invention and desire to secure by Letters Patent is:

Claims.

1. A paint removing compound adapted for dissolving and removing coats of dried paint from wood or iron painted surfaces, comprising the following ingredients mixed in the proportions as follows: caustic potash one pound; tri-sodium of phosphate one half pound; oxalic acid one half pound; hydrate of lime one pound; starch three ounces; and about one gallon of water.

2. A paint remover compound adapted for dissolving and neutralizing dried coats of paint from painted surfaces, comprising the following ingredients mixed in the proportions as follows: caustic alkali from one fourth to two pounds; tri-sodium phosphate from one fourth to two pounds; oxalic acid from one ounce to two pounds; hydrate of lime from one fourth to two pounds; starch one half to five ounces; and about one gallon of water.

In witness whereof I sign these specifications.

OTTO L. FLUEGEL.